(12) United States Patent
Gerweck

(10) Patent No.: US 10,530,779 B1
(45) Date of Patent: *Jan. 7, 2020

(54) DATA ACCESS AUTHORIZATION FOR DYNAMICALLY GENERATED DATABASE STRUCTURES

(71) Applicant: AtScale, Inc., San Mateo, CA (US)

(72) Inventor: Sarah Gerweck, Santa Clara, CA (US)

(73) Assignee: AtScale, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,456

(22) Filed: Mar. 31, 2018

Related U.S. Application Data

(63) Continuation of application No. 15/130,655, filed on Apr. 15, 2016, now Pat. No. 9,948,655.

(51) Int. Cl.
| | | |
|---|---|---|
| *H04L 29/06* | (2006.01) | |
| *G06F 16/22* | (2019.01) | |
| *G06F 16/28* | (2019.01) | |
| *G06F 16/2453* | (2019.01) | |

(52) U.S. Cl.
CPC ............ *H04L 63/102* (2013.01); *G06F 16/22* (2019.01); *G06F 16/2453* (2019.01); *G06F 16/283* (2019.01)

(58) Field of Classification Search
CPC ...................... G06F 17/30442; G06F 17/30592
See application file for complete search history.

(56) References Cited

U.S. PATENT DOCUMENTS

| | | |
|---|---|---|
| 6,684,207 B1 | 1/2004 | Greenfield et al. |
| 7,024,409 B2 * | 4/2006 | Iyengar ............... G06F 21/6254 |
| 7,707,143 B2 * | 4/2010 | Bruce ................... G06F 16/283 |
| | | 707/999.003 |
| 8,010,554 B1 | 8/2011 | Zhou |
| 8,041,670 B2 * | 10/2011 | Bakalash .......... G06F 16/24556 |
| | | 707/603 |
| 9,600,554 B2 | 3/2017 | Gerweck et al. |

(Continued)

OTHER PUBLICATIONS https://451research.com/report-short?entityId=92407, 451 Research Impact Report, "Kyvos adds SQL support, availability on Google Cloud for OLAP-on-Hadoop" May 8, 2017, 1 page.

(Continued)

*Primary Examiner* — James R Turchen
(74) *Attorney, Agent, or Firm* — Armis IP Law, LLC

(57) ABSTRACT

Techniques for determining user authorization to access data in dynamically generated database structures are presented. A method can commence upon receiving database statements from a user that is authorized to access a set of data in a database. A physical plan derived from the received database statements to operate on the database is inspected for references to dynamically generated data structures such as aggregates. A modified physical plan having no aggregates and/or other altered database structures is used to issue low latency database statements to operation on the database for verifying user access authorization to the underlying data. In some cases, the foregoing database statements are based on a virtual multidimensional data model. In other cases, a low latency directive is included in the modified physical plan to facilitate a low latency authorization response.

20 Claims, 10 Drawing Sheets

(56) References Cited

U.S. PATENT DOCUMENTS

| | | | |
|---|---|---|---|
| 2002/0038348 A1* | 3/2002 | Malone | G06F 16/951 |
| | | | 709/217 |
| 2004/0236767 A1 | 11/2004 | Soylemez et al. | |
| 2005/0278290 A1 | 12/2005 | Bruce et al. | |
| 2006/0116859 A1* | 6/2006 | Legault | G06F 16/284 |
| | | | 703/22 |
| 2007/0028108 A1* | 2/2007 | Cowburn | G06K 9/00 |
| | | | 713/172 |
| 2007/0113076 A1* | 5/2007 | Cowburn | H04K 1/00 |
| | | | 713/159 |
| 2007/0143289 A1* | 6/2007 | Dwork | G06F 16/2455 |
| 2007/0208721 A1 | 9/2007 | Zaman et al. | |
| 2009/0018996 A1 | 1/2009 | Hunt et al. | |
| 2009/0249125 A1 | 10/2009 | Bhatawdekar et al. | |
| 2010/0125565 A1* | 5/2010 | Burger | G06F 16/24542 |
| | | | 707/713 |
| 2011/0252049 A1 | 10/2011 | Marinescu et al. | |
| 2012/0089564 A1 | 4/2012 | Bakalash et al. | |
| 2012/0102453 A1 | 4/2012 | Patch et al. | |
| 2012/0215810 A1* | 8/2012 | Evans | G06F 16/24556 |
| | | | 707/771 |
| 2014/0012833 A1* | 1/2014 | Humprecht | G06F 21/6218 |
| | | | 707/711 |
| 2014/0040172 A1* | 2/2014 | Ling | G06N 5/022 |
| | | | 706/12 |
| 2015/0205951 A1* | 7/2015 | Anand | G06F 21/52 |
| | | | 726/25 |
| 2015/0278334 A1 | 10/2015 | Gerweck et al. | |
| 2015/0370872 A1* | 12/2015 | Raghavan | G06F 16/283 |
| | | | 726/5 |
| 2016/0098037 A1* | 4/2016 | Zornio | G05B 19/41855 |
| | | | 700/20 |
| 2016/0098448 A1* | 4/2016 | McShane | G06F 17/2705 |
| | | | 707/713 |
| 2016/0104002 A1* | 4/2016 | Schneider | G06F 16/254 |
| | | | 726/1 |
| 2016/0314173 A1* | 10/2016 | Lydick | G06F 16/24553 |
| 2016/0378919 A1* | 12/2016 | McNutt | G06Q 50/24 |
| | | | 705/3 |
| 2017/0091470 A1* | 3/2017 | Infante-Lopez | G06F 21/6218 |
| 2017/0103105 A1* | 4/2017 | Barsness | G06F 16/24542 |
| 2017/0235786 A9* | 8/2017 | Faith | G06Q 30/0631 |
| | | | 707/607 |

OTHER PUBLICATIONS https://www.ibm.com/support/knowledgecenter/en/ssw_i5_54/rzajq/rzajgdispatcher.htm, "Query Dispatcher", downloaded May 2, 2017, 1 page.

https://www.slideshare.net/AtulSharma225/kyvos-insights-datasheet-60646546 "Kyvos insights", Apr. 8, 2016, 2 pages.

International Preliminary Report & Written Opinion of PCT Application No. PCT/US2015/022082, dated Jun. 25, 2015, 3 pages total.

International Search Report & Written Opinion of PCT Application No. PCT/US2016/031684, dated Oct. 19, 2016, 6 pages total.

* cited by examiner

DATA ACCESS AUTHORIZATION FOR DYNAMICALLY GENERATED DATABASE STRUCTURES

RELATED APPLICATIONS

The present application is a continuation of, and claims the benefit of priority to co-pending U.S. patent application Ser. No. 15/130,655 titled, "DATA ACCESS AUTHORIZATION FOR DYNAMICALLY GENERATED DATABASE STRUCTURES", filed Apr. 15, 2016, which is hereby incorporated by reference in its entirety.

FIELD

This disclosure relates to data analytics, and more particularly to techniques for data access authorization for dynamically generated database structures.

BACKGROUND

With the continued proliferation of information sensing devices (e.g., mobile phones, online computers, RFID tags, sensors, etc.), increasingly larger volumes of data are collected for various business intelligence purposes. For example, the web browsing activities of online users are captured in various datasets (e.g., cookies, log files, etc.) for use by online advertisers in targeted advertising campaigns. Data from operational sources (e.g., point of sale systems, accounting systems, CRM systems, etc.) can also be combined with the data from online sources. Relying on traditional database structures (e.g., relational) to store such large volumes of data can result in database statements (e.g., queries) that are complex, resource-intensive, and time consuming. Deploying multidimensional database structures enables more complex database statements to be interpreted (e.g., executed) with substantially less overhead. Some such multidimensional models and/or analysis techniques (e.g., online analytical processing or OLAP) can enable a user (e.g., business intelligence analyst) to view the data in "cubes" comprising multiple dimensions (e.g., product name, order month, etc.) and associated cells (e.g., defined by a combination of dimensions) holding a value that represents a measure (e.g., sale price, quantity, etc.). Further, with such large volumes of data from varying sources and with varying structures (e.g., relational, multidimensional, delimited flat file, document, etc.), the use of data warehouses and distributed file systems (e.g., Hadoop distributed file system or HDFS) to store and access data has increased. For example, an HDFS can be implemented for databases having a flat file structure with predetermined delimiters, and associated metadata (e.g., describing the keys for the respective delimited data values), to accommodate a broad range of data types and structures.

In many cases, such distributed file systems can be "append only" data stores and can comprise fact tables with over a billion rows. Further, these data stores are continually being modified (e.g., new rows appended) with new data, precipitating challenges related to data quality (e.g., "freshness", accuracy, etc.). The users of such large and dynamic datasets desire to query the datasets with a high level of performance, characterized by fast query response times and accurate query results, across various query engines (e.g., Impala, Spark SQL, Hive, Drill, Presto, etc.) and data storage environments (e.g., HDFS). One approach for providing such high performance querying might alter certain database structures to reduce access latency. Specifically, an aggregate of a certain portion of a dataset can be generated to facilitate a faster access to that portion of the dataset. In some cases, the aggregate might be generated dynamically based at least in part on a query or queries issued by the user. A database structure can also be altered by creating logical and/or physical dataset partitions (e.g., shards) to enable high performance querying. For example, a portion of a dataset that is accessed often might be partitioned to a cache memory and/or other low latency location (e.g., geographically closer data storage facility) to reduce access latency. In certain cases, such database structure alteration operations and/or other functions (e.g., query translation, query planning, etc.) can be implemented by a third party application in one or more layers between the business intelligence (BI) tools of the resource owner (e.g., data owner, user) and the computing and/or storage devices managing the access to the resource (e.g. data). In such cases, the third party application can facilitate a delegated authorization approach (e.g., using LDAP, Kerberos, SAML, OAuth, OpenID, etc.) to receive an authorization from the data owners to access their data using a set of credentials different than those of the resource owners. Such delegated authorization and/or authentication techniques can improve security and/or efficiency in the earlier described data analysis environments.

Unfortunately, legacy techniques for applying delegated data access authorization to altered database structures can be limited at least as pertaining to database structures that might be dynamically generated. As an example, database structure alterations pertaining to aggregates can inherently lose data information (e.g., underlying data details), but can also lose security information (e.g., underlying data access authorizations, permissions, etc.). Some legacy approaches might address such security information loss by inspecting the authorization attributes (e.g., permissions, etc.) associated with the underlying data of the aggregate to recreate permissions for the aggregate structures (e.g., aggregate tables, views, partitions, etc.). For example, a data warehousing environment might implement such an approach when building certain data warehouses for BI tool access. Such approaches, however, can be limited in environments that dynamically perform certain database alterations at query time. In such environments, for example, extracting and recreating authorization attributes for an aggregate might negate any efficiency improvements facilitated by the aggregate. Further, the extraction and/or re-creation methods implemented by various third party applications can differ substantially, resulting in various inefficiencies relating to the interaction of the numerous applications (e.g., tools) in the data analysis ecosystem. Further, the multiple database structures (e.g., relational, multidimensional, delimited flat file, document, etc.) comprising the foregoing distributed file systems can precipitate a more complex permissions extraction problem. Other legacy approaches might require each third party application to manage a respective set of authorization attributes to facilitate various database structures (e.g., aggregates, partitions, local caches, etc.) that might be accessed using the third party application. Such approaches can place a significant resource (e.g., computing, storage, human, etc.) burden on the third party application, third party application provider, resource management applications, and/or resource owner to manage multiple copies of authorization attributes across numerous enterprise users and/or third party applications in the ecosystem. In some cases, certain legacy approaches might merely bypass any authorization associated with an aggregate and/or other altered database structure. Such approaches can be particularly limited in high security data environments such as those related to healthcare or financial services.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for data access authorization for dynamically generated database structures, which techniques advance the relevant technologies to address technological issues with legacy approaches. More specifically, the present disclosure provides a detailed description of techniques used in systems, methods, and in computer program products for data access authorization for dynamically generated database structures. Certain embodiments are directed to technological solutions for issuing a low latency query on a set of subject data to determine an authorization to access an altered database structure derived from the subject data, which embodiments advance the relevant technical fields as well as advancing peripheral technical fields. The disclosed embodiments modify and improve over legacy approaches. In particular, the herein-disclosed techniques provide technical solutions that address the technical problems attendant to applying delegated data access authorization to dynamically generated database structures.

Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Specifically, one or more disclosed embodiments can facilitate receiving subject database statements from a user authorized to access subject data having a certain structure (e.g., table) in a subject database. Various planned (e.g., optimized) subject data statements derived from the subject database statements to operate on the subject database can be inspected for references to altered subject data structures (e.g., aggregates). While the user might have an access authorization for the subject data structure, an authorization to access any referenced altered subject data structures can be nebulous. The authorization for the user to access the altered subject data structures can be determined by constructing and issuing certain low latency subject database statements, based at least in part on the subject database statements but having no altered subject data structure references, to determine an authorization response. In certain embodiments, the altered subject data structures can be dynamically generated responsive to receiving the subject database statements. In some embodiments, the low latency subject database statements can be constructed based at least in part on a low latency directive to reduce the latency for receiving the authorization response. In other embodiments, the subject database statements, the planned subject database statements, or the low latency subject database statements can be based at least in part on a virtual multidimensional data model.

Further details of aspects, objectives, and advantages of the technological embodiments are described herein and in the following descriptions, drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
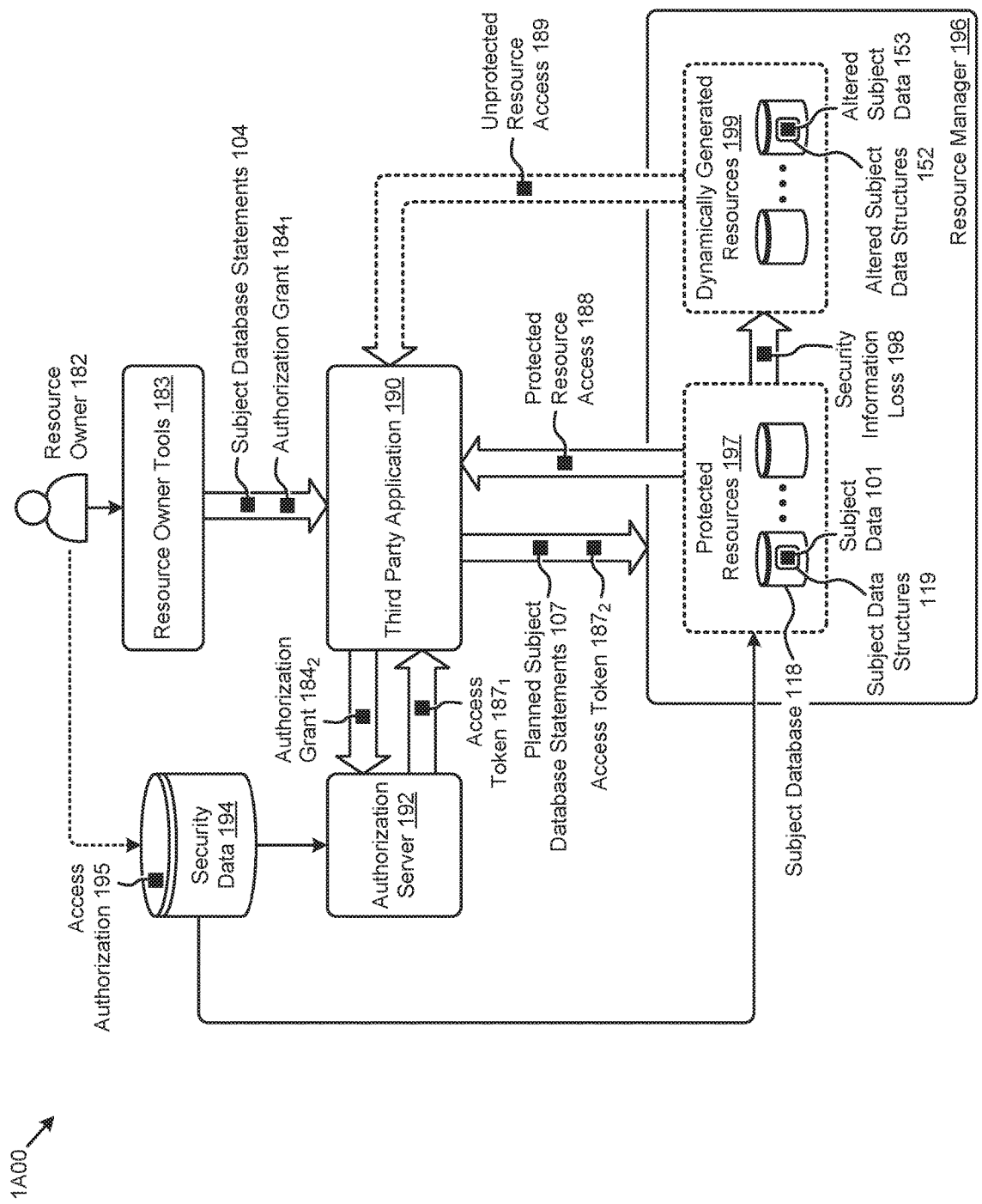
FIG. 1A illustrates a delegated resource access authorization technique.

Some embodiments of the present disclosure address the problem of applying delegated data access authorization to dynamically generated database structures and some embodiments are directed to approaches for issuing a low latency query on a set of subject data to determine an authorization to access an altered database structure derived from the subject data. The accompanying figures and discussions herein present example environments, systems, methods, and computer program products for data access authorization for dynamically generated database structures.

Overview

Disclosed herein are techniques for issuing low latency queries on a subject database to determine an authorization to access an altered subject data structure derived from the subject database. Specifically, in some embodiments, a subject database statement (e.g., query) from a user authorized to access the subject database can be analyzed to determine a planned subject database statement to operate on the subject database comprising various subject data. The planned subject database statement can be inspected for attributes referencing one or more altered subject data structures derived from the subject data. For example, the altered subject data structures (e.g., aggregate tables) might be dynamically generated for use in the planned subject database statement to improve statement response performance. If the planned subject database statement references any altered subject data structures, a low latency subject database statement having no altered subject data structure references is constructed to operate on the subject database to determine an authorization to access the altered subject data structures. In certain embodiments, the authorization for altered subject data structure access can be determined in part from an authorization response received responsive to issuing the low latency subject database statement. In some embodiments, a low latency directive can be used to construct the low latency subject database statement to reduce the latency associated with receiving the authorization response. In one or more embodiments, if no authorization violations are discovered from the authorization response, the planned subject database statement can be executed. In other embodiments, if issuing the low latency subject database statement identifies one or more authorization violations, an error can be returned to the user. In such cases, the error attributes can be returned in the authorization response.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A illustrates a delegated resource access authorization technique 1A00. The delegated resource access authorization technique 1A00 can be implemented in environments comprising one or more instances of a third party application 190 performing various functions to facilitate access to a set of protected resources 197 by a resource owner 182 using various applications and/or tools (e.g., resource owner tools 183). In some authentication approaches, the resource owner 182 (e.g., person, group, enterprise, etc.) might request access to the protected resources 197 (e.g., data stores) managed by a resource manager 196 (e.g., gateway server) by authenticating with the resource manager 196 using the credentials of the resource owner 182. For example, the resource owner 182 might establish an access authorization 195 corresponding to the credentials in a set of security data 194 that can be associated with the protected resources 197. With such approaches, the credentials of the resource owner 182 can also be shared with the third party application 190 to access the protected resources 197. However, there can be several problems and/or limitations with such approaches. For example, the resource owner 182 (e.g., healthcare enterprise, financial services enterprise, etc.) might have limitations pertaining to providing certain security credentials to the third party application 190. When certain security credentials of the resource owner 182 are shared with the third party application 190, the third party application 190 might gain a broad access to the protected resources 197 with limited ability by the resource owner 182 to implement access restrictions (e.g., access duration limits, resource subset permissions, etc.). In some cases, the resource owner 182 also might not be able to revoke access to the third party application 190 without revoking access to all third party applications used to access the protected resources 197.

The delegated resource access authorization technique 1A00 can address the foregoing issues and/or other authentication and/or authorization issues by effectively implementing a logical authorization layer to enable the resource owner 182 to delegate authorization to the third party application 190. Various protocols for implementing delegated authorization techniques such as the delegated resource access authorization technique 1A00 are possible, including LDAP, Kerberos, SAML, OAuth, OpenID, and/or other protocols. Specifically, as shown, the delegated resource access authorization technique 1A00 might generally comply with the OAuth 2.0 protocol to facilitate the third party application 190 receiving an authorization grant $184_1$ from the resource owner tools 183 of the resource owner 182. For example, the third party application 190 (e.g., data analysis application) might request the authorization grant $184_1$ based at least in part on a set of subject database statements 104 issued to the third party application 190 from the resource owner tools 183. Specifically, the request for the authorization grant $184_1$ might be responsive to the third party application detecting that the subject database statements 104 are associated with a subject database 118 in the protected resources 197 having various instances of subject data structures 119 comprising a set of subject data 101. In some cases, the authorization grant $184_1$ can represent the credentials (e.g., access authorization 195) of the resource owner 182. The third party application 190 can present an instance of the authorization grant $184_2$ to an authorization server 192 for authentication. Authentication of the authorization grant $184_2$ by the authorization server 192 can result in an access token $187_1$ being returned to the third party application 190. For example, the access token $187_1$ can be a string object characterizing a certain access scope, access duration, and/or other protected resource access attributes. An instance of the access token $187_2$ might then be issued to provide a protected resource access 188. For example, the access token $187_2$ might then be issued with a set of planned subject database statements 107 generated by the third party application 190 to return a result set derived from the subject database 118 in the protected resources 197.

In some cases, the resource owner 182 and/or the third party application 190 might desire to access a set of dynamically generated resources 199 that might not be associated with the access authorization 195. Specifically, access to various instances of altered subject data structures 152 comprising sets of altered subject data 153 might be desired. For example, an aggregate (e.g., sum of sales) partitioned by time (e.g., calendar quarter) might have been dynamically generated from the subject data 101 based at least in part on the subject database statements 104 issued by the resource owner 182 to provide an improved response time. In such cases, the altered subject data structures 152 comprising the partitioned aggregate tables and/or views can exhibit a security information loss 198. Specifically, for example, the resource manager 196 might consider the dynamically generated resources 199 as unprotected (e.g., not requiring an access token) such that an unprotected resource access 189 might be provisioned to the third party application 190 and/or the resource owner 182. Such instances of unprotected resource access 189 can violate certain security policies in many environments, such as healthcare, financial services, and/or other environments.

The herein-disclosed techniques can address such technical problems attendant to applying delegated resource access authorization to dynamically generated resources. One embodiment illustrating such techniques implemented in a distributed data analysis environment is presented in FIG. 1B.

Figure 1B:
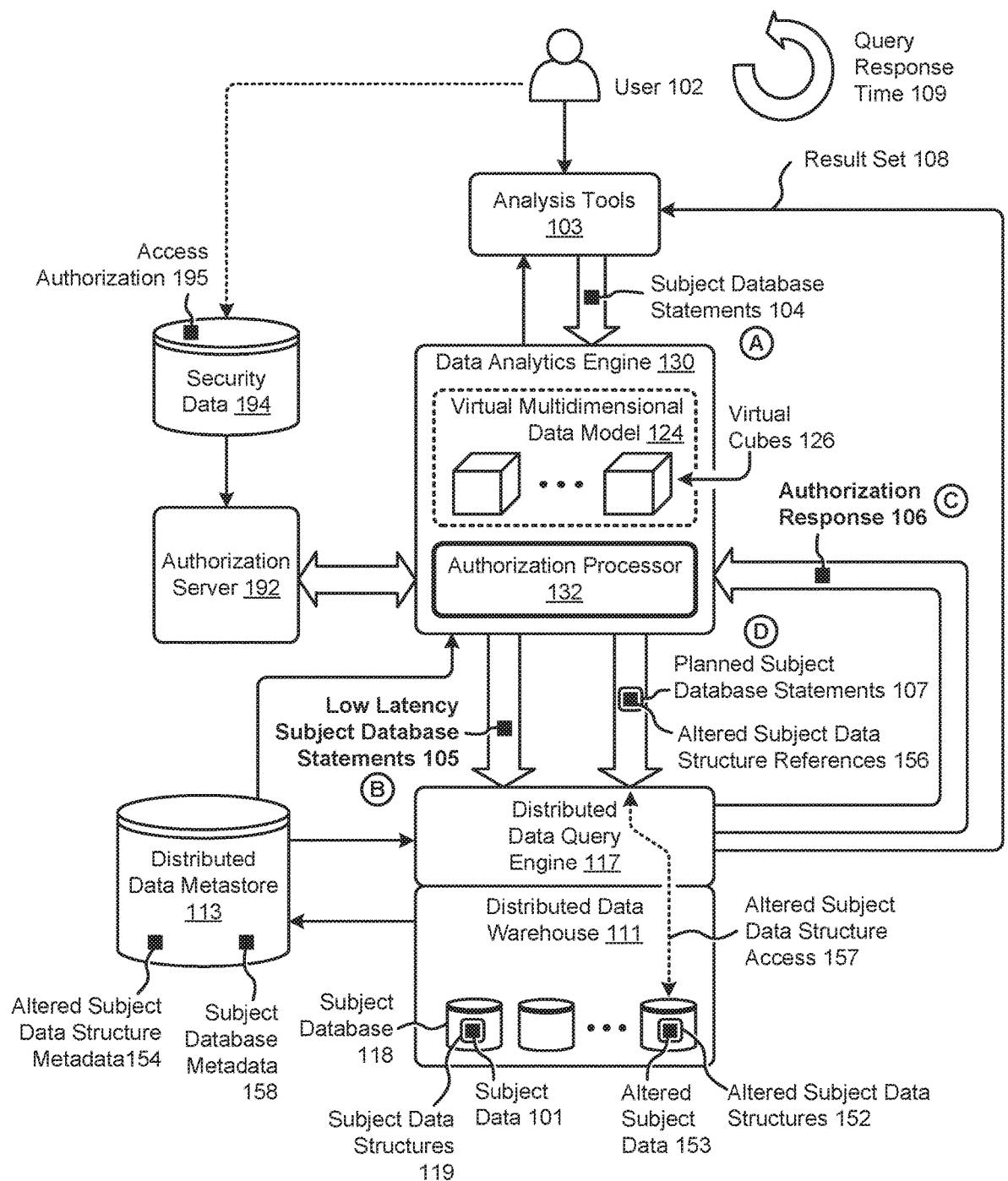
FIG. 1B presents a diagram illustrating techniques for data access authorization for dynamically generated database structures, according to an embodiment.

FIG. 1B presents a diagram 1B00 illustrating techniques for data access authorization for dynamically generated database structures. As an option, one or more variations of diagram 1B00 or any aspect thereof may be implemented in the context of the architecture and functionality of the embodiments described herein. The diagram 1B00 or any aspect thereof may be implemented in any environment.

As shown in FIG. 1B, diagram 1B00 shows a user 102 (e.g., business intelligence analyst) interacting with certain instances of analysis tools 103 (e.g., Tableau, Excel, QlikView, Business Objects, etc.) that can communicate messages representing various instances of subject database statements 104 to be interpreted on associated datasets. In some cases, the user 102 may want to perform analyses on a set of subject data 101 (e.g., mobile activity, social network activity, transactions, CRM activity, etc.) that is stored in a subject database 118 (e.g., as flat file data, multidimensional data, etc.) in a distributed data warehouse 111. The subject data structures 119 and/or other characteristics of the subject database 118 can be specified by certain attributes (e.g., database definitions, schema definitions, etc.) comprising certain instances of subject database metadata 158 in a distributed data metastore 113. As an example, the distributed data warehouse 111 can be configured to conform to the HDFS framework and the distributed data metastore 113 can be a Hive metastore. As shown, the subject database statements 104 can be delivered to a data analytics engine 130 to produce associated instances of planned subject database statements 107 that can be issued to a distributed data query engine 117 for operation on the subject database 118.

In an exemplary embodiment, the subject database statements 104 can be configured to operate on a selected instance of a virtual multidimensional data model 124 and/or some representation of the virtual multidimensional data model 124. Specifically, the virtual multidimensional data model 124 can comprise one or more logical representations (e.g., virtual cubes 126) of the subject database 118 that can be presented to the user 102 to facilitate a broad range of analyses of the underlying data (e.g., subject data 101). In some embodiments, the virtual cubes 126 can characterize certain dimensions, measures, relationships (e.g., explicit, inferred, etc.), dependencies, and/or other attributes associated with the subject data 101. For example, the virtual cubes 126 can be based at least in part on a set of subject database attributes comprising the subject database metadata 158. In such cases, the subject database statements 104 configured for the virtual multidimensional data model 124 can be received by the data analytics engine 130 to produce associated instances of planned subject database statements 107 that can be issued to the distributed data query engine 117.

Further details related to generation and use of a virtual multidimensional data model are disclosed in U.S. patent application Ser. No. 14/665,032, entitled "INTERPRETING RELATIONAL DATABASE STATEMENTS USING A VIRTUAL MULTIDIMENSIONAL DATA MODEL" filed on Mar. 23, 2015, the contents of which is hereby incorporated by reference in its entirety in the present application.

As shown, the data analytics engine 130 can serve as the third party application or "client" in a delegated access authorization system. Specifically, the data analytics engine 130 can communicate with the authorization server 192 to exchange authorization grants and/or access tokens representing the access authorization 195 enabling the user 102 to access the subject database 118 using the data analytics engine 130. For example, the user 102 and/or some entity (e.g., enterprise) associated with the user 102 can establish the access authorization 195 using various encrypted structures in the security data 194. Further, in one or more embodiments, the distributed data query engine 117 can be a Structured Query Language (SQL) based query engine for accessing distributed file systems (e.g., Impala, Spark SQL, Hive, Drill, Presto, etc.). Other query engine configurations and partitions are possible.

For large sets of subject data 101 stored in the subject database 118, a query response time 109 to return a result set 108 can be long (e.g., several minutes to hours). In such cases, certain instances of altered subject data structures 152 comprising altered subject data 153 might be generated. Certain attributes (e.g., schema definitions, etc.) characterizing the altered subject data structures 152 might also be specified in certain instances of altered subject data structure metadata 154 in the distributed data metastore 113. As an example, the data analytics engine 130 might determine one or more aggregates from the virtual multidimensional data model 124 representing the subject database 118 to generate various aggregate tables and/or aggregate metadata comprising the altered subject data structures 152 and/or altered subject data structure metadata 154, respectively. Such aggregates can be used to reduce the query response time 109 by facilitating access to smaller aggregate tables in some or all of the query comprising the planned subject database statements 107. In some cases, the data analytics engine 130 can dynamically generate (e.g., by heuristic techniques, machine learning techniques, etc.) the altered subject data structures 152 (e.g., tables, partitions, etc.) and/or update existing instances of the altered subject data structures 152 at query time (e.g., responsive to the subject database statements 104).

Further details related to generation and updating of aggregates are disclosed in U.S. patent application Ser. No. 14/945,430, entitled "DYNAMIC AGGREGATE GENERATION AND UPDATING FOR HIGH PERFORMANCE QUERYING OF LARGE DATASETS" filed on Nov. 19, 2015, the contents of which is hereby incorporated by reference in its entirety in the present application.

As earlier described, such instances of altered subject data structures 152 can exhibit a security information loss that can render access to the altered subject data structures 152 and underlying instances of altered subject data 153 unprotected, at least as pertaining to the access authorization 195 associated with the user 102. In this case, the unprotected access to the altered subject data structures 152 that might be contained in the subject database statements 104 and/or the planned subject database statements can violate certain security policies in many environments, such as healthcare, financial services, and/or other environments. According to some embodiments, the approach shown in diagram 1B00 and described herein for verifying data access authorization for dynamically generated database structures (e.g., altered subject data structures 152) can be facilitated by an authorization processor 132 at the data analytics engine 130. Specifically, the techniques disclosed herein can issue one or more instances of low latency subject database statements 105 (e.g., queries) on the subject database 118 to determine an authorization to access the altered subject data structures 152 derived from the subject database 118. More specifically, as indicated by the lettered sequence of steps A-D in FIG. 1B, the subject database statements 104 (e.g., query) from the user 102 having an access authorization 195 to access the subject data structures 119 comprising the subject database 118 can be analyzed to determine certain instances of planned subject database statements 107 to operate on the subject database 118 comprising the subject data 101 (see step A). The planned subject database statements 107 can be inspected for one or more instances of altered subject data structure references 156. For example, the altered subject data structure references 156 can indicate an altered subject data structure access 157 to certain altered subject data structures 152 that might be required by the planned subject database statements.

If the planned subject database statements 107 reference any of the altered subject data structures 152, one or more instances of the low latency subject database statements 105 having no references to the altered subject data structures 152 can be constructed to operate on the subject database 118 to determine an authorization for the altered subject data structure access 157 to the altered subject data structures 152 associated with the planned subject database statements 107 (see step B). In certain embodiments, the authorization for the altered subject data structure access 157 can be determined in part from an authorization response 106 received responsive to the low latency subject database statements 105 (see step C). In some embodiments, one or more low latency directives can be used to construct the low latency subject database statements 105 to reduce the latency associated with receiving the authorization response 106. In some embodiments, if no authorization violations are discovered from the authorization response 106, the planned subject database statements 107 can be executed (see step D). In other embodiments, if issuing the low latency subject database statements 105 identifies one or more authorization violations, an error can be returned to the user 102. In such cases, the error attributes can be returned in the authorization response 106.

Figure 1C:
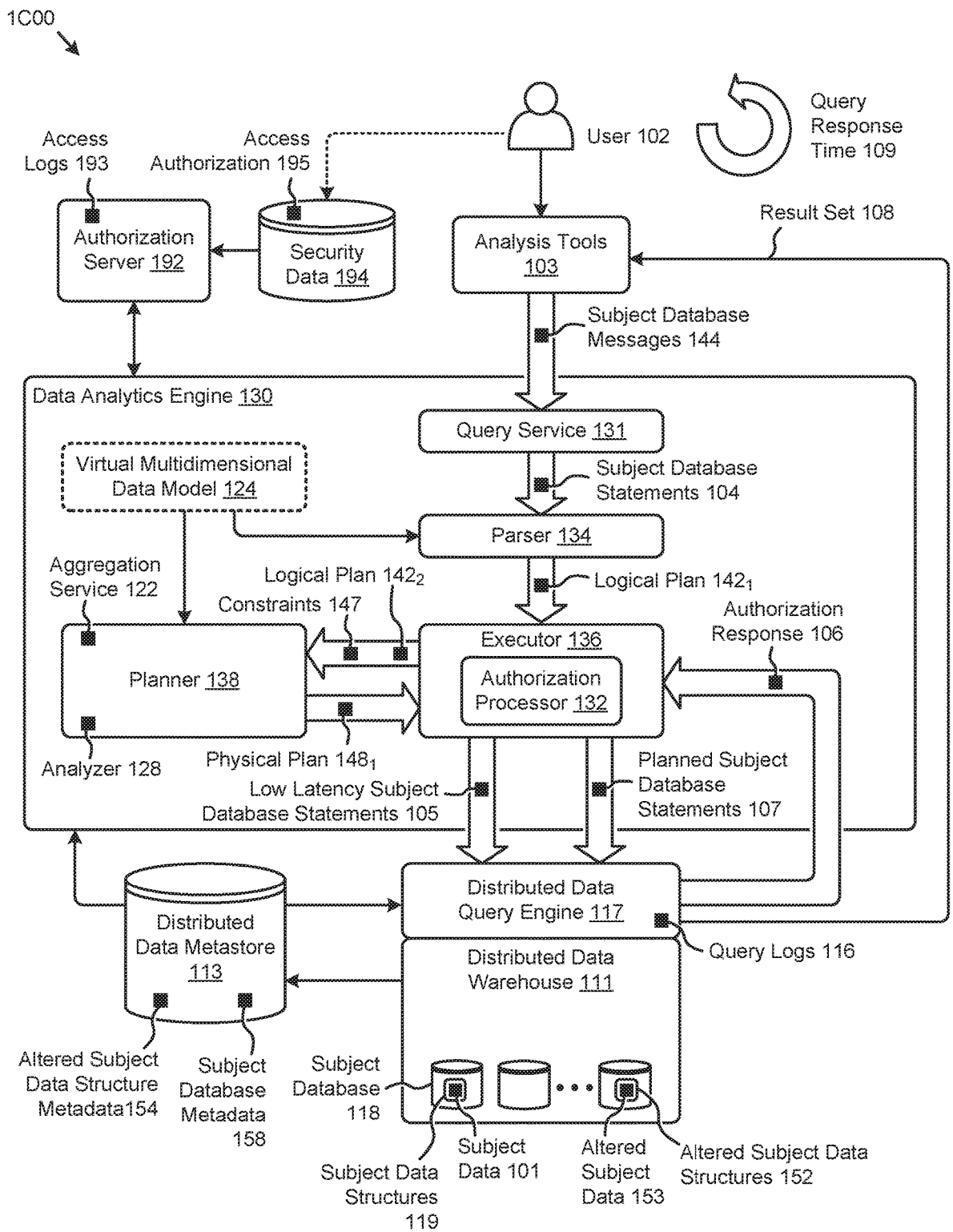
FIG. 1C presents a block diagram of a system that implements data access authorization for dynamically generated database structures, according to an embodiment.

One embodiment of a system for implementing the herein disclosed techniques for data access authorization pertaining to dynamically generated database structures is described as pertains to FIG. 1C.

FIG. 1C presents a block diagram 1C00 of a system that implements data access authorization for dynamically generated database structures. As an option, one or more variations of block diagram 1C00 or any aspect thereof may be implemented in the context of the architecture and functionality of the embodiments described herein. The block diagram 1C00 or any aspect thereof may be implemented in any environment.

As shown, block diagram 1C00 comprises the components described in FIG. 1B with more details to further describe one embodiment of a system for implementing the herein disclosed techniques and approach. Other components and/or operation partitioning are possible. Specifically, the data analytics engine 130 is shown to further comprise a query service 131, a parser 134, an executor 136 comprising the authorization processor 132, and a planner 138. As earlier described, the data analytics engine 130 can further interact with the analysis tools 103 operated by one or more users (e.g. user 102), the distributed data query engine 117 facilitating access to the distributed data warehouse 111, and the authorization server 192 enabling certain authorization and/or authentication functions using, in part, the security data 194. The distributed data warehouse 111 is further shown to comprise the subject database 118 holding the subject data 101 in various instances of subject data structures 119, and certain instances of altered subject data 153 in altered subject data structures 152. A distributed data metastore 113 can further comprise, the subject database metadata 158 characterizing the subject data structures 119, and the altered subject data structure metadata 154 characterizing the altered subject data structures 152, for use by the distributed data query engine 117, the data analytics engine 130, and/or other components.

Various data flows, data structures, and data messages among the components in the block diagram 1C00 are also shown. More specifically, the authorization processor 132 in the data analytics engine 130 can construct various instances of low latency subject database statements 105 for issuing on the subject database 118 to determine an authorization to access one or more of the altered subject data structures 152 using the planned subject database statements 107 derived from a set of subject database statements 104 invoked by the user 102. Specifically, in some embodiments, a set of subject database messages 144 (e.g., using HTTP, Thrift, XMLA, etc.) comprising database operation (e.g., query) information can be received by the query service 131 from the analysis tools 103. In some cases, the query service 131 can serve as an application programming interface or API to the various instances of analysis tools 103 (e.g., Tableau, Excel, QlikView, Business Objects, etc.). The query service 131 can translate the subject database messages 144 to a corresponding set of subject database statements 104 (e.g., SQL statements, MDX statements, etc.). The parser 134 can parse the subject database statements 104 to determine a logical plan $142_1$ that can satisfy the subject database statements 104. In certain embodiments, the logical plan $142_1$ can be based at least in part on the virtual multidimensional data model 124. For example, the logical plan $142_1$ can comprise various programming code objects characterizing certain attributes describing a query structure and strategy (e.g., virtual cube references, joins, unions, sequencing, etc.) to be evaluated on the subject database 118.

The logical plan $142_1$ can be received by the executor 136 that can serve in part as a broker with the planner 138 in facilitating the development of a physical plan $148_1$ that can be used to derive a set of planned subject database statements 107 to issue a result set 108 to the user 102. Specifically, the planner 138 can receive an instance of the logical plan $142_2$ and/or various instances of constraints 147 from the executor to generate (e.g., using heuristic algorithms) the physical plan $148_1$. For example, the constraints 147 might indicate whether certain altered data structures, such as aggregates, should be used in generating the physical plan $148_1$. Specifically, the planner 138 can examine the logical plan $142_2$, the constraints 147, the metadata in the distributed data metastore 113, the virtual multidimensional data model 124, and/or other information to determine a physical plan $148_1$ that is optimized (e.g., minimized instance of the query response time 109). In some cases, the planner 138 might reference certain instances of the altered subject data structures 152 (e.g., aggregates, partitions, shards, indexes, materialized views, caches, etc.) to facilitate such minimization of the query response time 109. In other cases, an aggregation service 122 in the planner 138 can dynamically generate one or more aggregates and/or other altered data structures based at least in part on the received instance of the logical plan $142_2$. In many cases, determining an optimal query plan (e.g., physical plan $148_1$) might be an NP-complete problem. In such cases, an analyzer 128 in the planner 138 can facilitate the generation of the physical plan $148_1$ in a time period that can be acceptable by the user issuing the subject database statements 104. Specifically, the analyzer 128 can pre-calculate certain data structures from the available information (e.g., the virtual multidimensional data model 124) to identify various relationships (e.g., joins) and corresponding costs (e.g., time to execute JOIN Customers) that can be used by the planner 138 in generating the physical plan $148_1$.

As earlier mentioned, the physical plan $148_1$ used by the executor 136 to generate the planned subject database statements 107 to be issued for returning the result set 108 might reference the altered subject data structures 152 (e.g., aggregate tables). In such cases, the access authorization 195 provisioned to the user 102 for accessing the subject database 118 in a delegated authorization approach may not be properly applied to the altered subject data 153 (e.g., aggregated subject data) comprising the altered subject data structures 152. In some such cases, access to the altered subject data 153 might be denied, which can result in an execution error. In other such cases, an unprotected access to the altered subject data 153 might be provisioned, resulting in a possible security breach of the underlying subject data. To mitigate the foregoing problems, according to the herein disclosed techniques, the authorization processor 132 can inspect the physical plan $148_1$ received by executor 136 for attributes referencing any of the altered subject data structures 152 (e.g., aggregate tables). For example, the authorization processor 132 can traverse the objects comprising the physical plan $148_1$ to identify any altered subject data structure references.

If the physical plan $148_1$ references any of the altered subject data structures 152, the herein disclosed techniques can construct one or more instances of the low latency subject database statements 105 to determine an authorization to access the altered subject data 153 in the altered subject data structures 152. Specifically, the authorization processor 132 can issue another instance of the logical plan $142_2$ to the planner 138 with the constraints 147 indicating that no altered data structures (e.g., no aggregates) can be used in the resulting instance of the physical plan $148_1$. Since a physical plan $148_1$ having no aggregates and/or other statement optimization (e.g., statement response latency minimization) structures can have a long execution time, the instance of the physical plan $148_1$ used for authorization verification can be modified to include one or more low latency directives to minimize the execution time. In some cases, such low latency directives can be associated with the type of data store comprising the distributed data warehouse 111. For example, an Impala instance of the distributed data query engine 117 can have certain built-in structures that can be used as low latency directives when accessing an HDFS instance of the distributed data warehouse 111. More specifically, the distributed data query engine 117 might provide engine-specific syntax for one or more low latency directives to facilitate low latency authorization verification. In other cases, a numerical constraint (e.g., 1=0) that solves to a FALSE result might serve as the low latency directive for a given instance of the physical plan $148_1$.

The instance of the physical plan $148_1$ comprising the low latency directive can then be used to generate the low latency subject database statements 105 to determine the authorization response 106. If the authorization response 106 indicates the user 102 has authorization to access the portion of the subject data 101 underlying the altered subject data structures 152, the earlier generated instance of the physical plan $148_1$ associated with the subject database statements 104 from the user 102 can be used to generate the planned subject database statements 107 for issuing to the distributed data query engine 117. If the authorization response 106 indicates the user 102 does not have authorization to access the portion of the subject data 101 underlying the altered subject data structures 152, an error can be returned to the user 102. In some embodiments, the herein disclosed techniques can further facilitate certain auditing (e.g., audit trails) that might be required in certain environments. Specifically, a set of query logs 116 associated with the low latency subject database statements 105 and/or the planned subject database statements 107 might be collected at the distributed data query engine 117, and/or a set of access logs 193 corresponding to access requests (e.g., access token requests) issued by the data analytics engine 130 might be collected at the authorization server 192.

Figure 2:
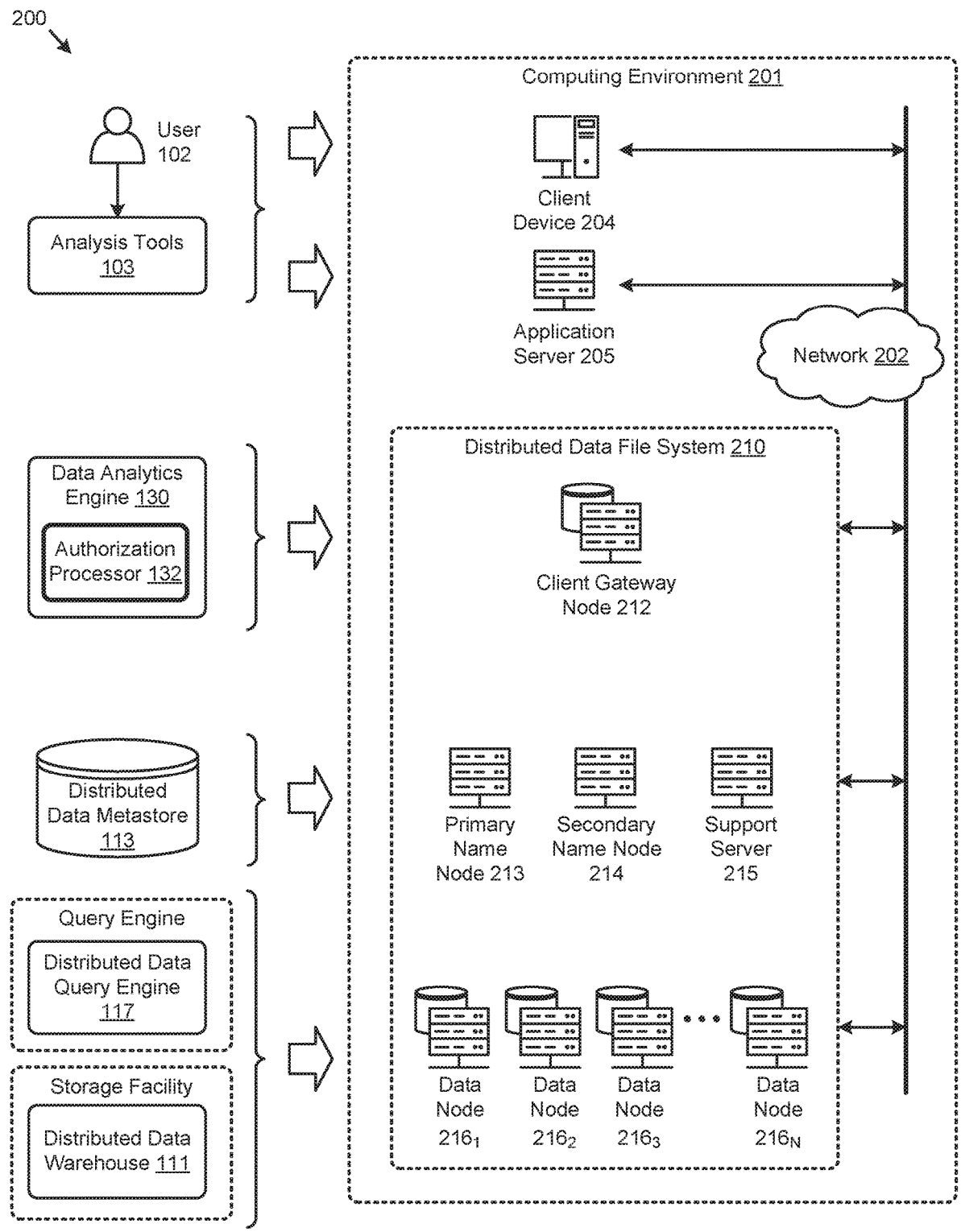
FIG. 2 presents a schematic of an environment suitable for implementing a system for data access authorization for dynamically generated database structures, according to an embodiment.

One embodiment of a computing and/or storage environment for implementing the foregoing use model and herein disclosed techniques is described in FIG. 2.

FIG. 2 presents a schematic 200 of an environment suitable for implementing a system for data access authorization for dynamically generated database structures. As an option, one or more variations of schematic 200 or any aspect thereof may be implemented in the context of the architecture and functionality of the embodiments described herein. The schematic 200 or any aspect thereof may be implemented in any environment.

As shown in FIG. 2, a computing environment 201 comprises one or more instances of a client device 204 (e.g., a desktop computer), one or more instances of an application server 205, and one or more instances of a distributed data file system 210. The aforementioned devices, servers, and systems can communicate through a network 202 (e.g., a wireless network, a wide area network (WAN), a local area network (LAN), the Internet, an intranet, a private network, etc.). More specifically, the distributed data file system 210 can be configurable to store and process large volumes of data (e.g., in an HDFS framework) and comprise one or more instances of a client gateway node 212, one or more instances of a primary name node 213, one or more instances of a secondary name node 214, one or more instances of a support server 215 (e.g., executing data analysis processes, etc.), and a plurality of data nodes (e.g., data node $216_1$, data node $216_2$, data node $216_3$, to data node $216_N$). The distributed data file system 210 can be configured to store large files of data across multiple computing devices (e.g., the plurality of data nodes), rather than store all of the files on a single computing device with a large amount of storage capacity. To accommodate such distributed storage, the plurality of data nodes can be configured with one or more rack-mounted servers coupled (e.g., by SATA or SAS interconnects) to multiple solid-state drives (SSDs) and/or hard disk drives (HDDs) for storing the data. As an example, when a file is loaded into distributed data file system 210, it is replicated and partitioned into "blocks" of data, which are distributed and stored across the plurality of data nodes. The primary name node 213 is responsible for storage and management of metadata associated with the distributed data file system 210, such that, for example, the primary name node 213 can provide data location information for data processing operations. Further, other configurations, partitions, and architectures of the distributed data file system 210 shown in computing environment 201 are possible. For example, a single-node implementation may have all of the nodes (e.g., client gateway node 212, primary name node 213, the plurality of data nodes, etc.) reside on a single computing device. Also, a small cluster of two nodes may have a first computing device operate as a name node and a second computing device operate as a data node. Further, the distributed data file system 210 can represent any database management system.

In one or more embodiments, the aforementioned devices, servers, and systems in computing environment 201 can be configured to implement techniques for data access authorization for dynamically generated database structures as described in FIG. 1B and herein. Specifically, the schematic 200 associates the components described in FIG. 1B with the client device 204, the application server 205, and the distributed data file system 210 of computing environment 201. More specifically, as shown in FIG. 2, the client device 204 (e.g., operated by user 102) and/or the application server 205 can store program instructions corresponding to the operations of the analysis tools 103. Further, the client gateway node 212 can store program instructions corresponding to the operations of the data analytics engine 130 and the authorization processor 132. Further, the distributed data metastore 113 can be stored in a storage facility (e.g., one or more SSDs and/or HDDs) coupled to the primary name node 213. The data and databases distributed across the plurality of data nodes can be operated over by a query engine such as distributed data query engine 117 that communicates with a storage facility such as the distributed data warehouse 111.

Figure 3:
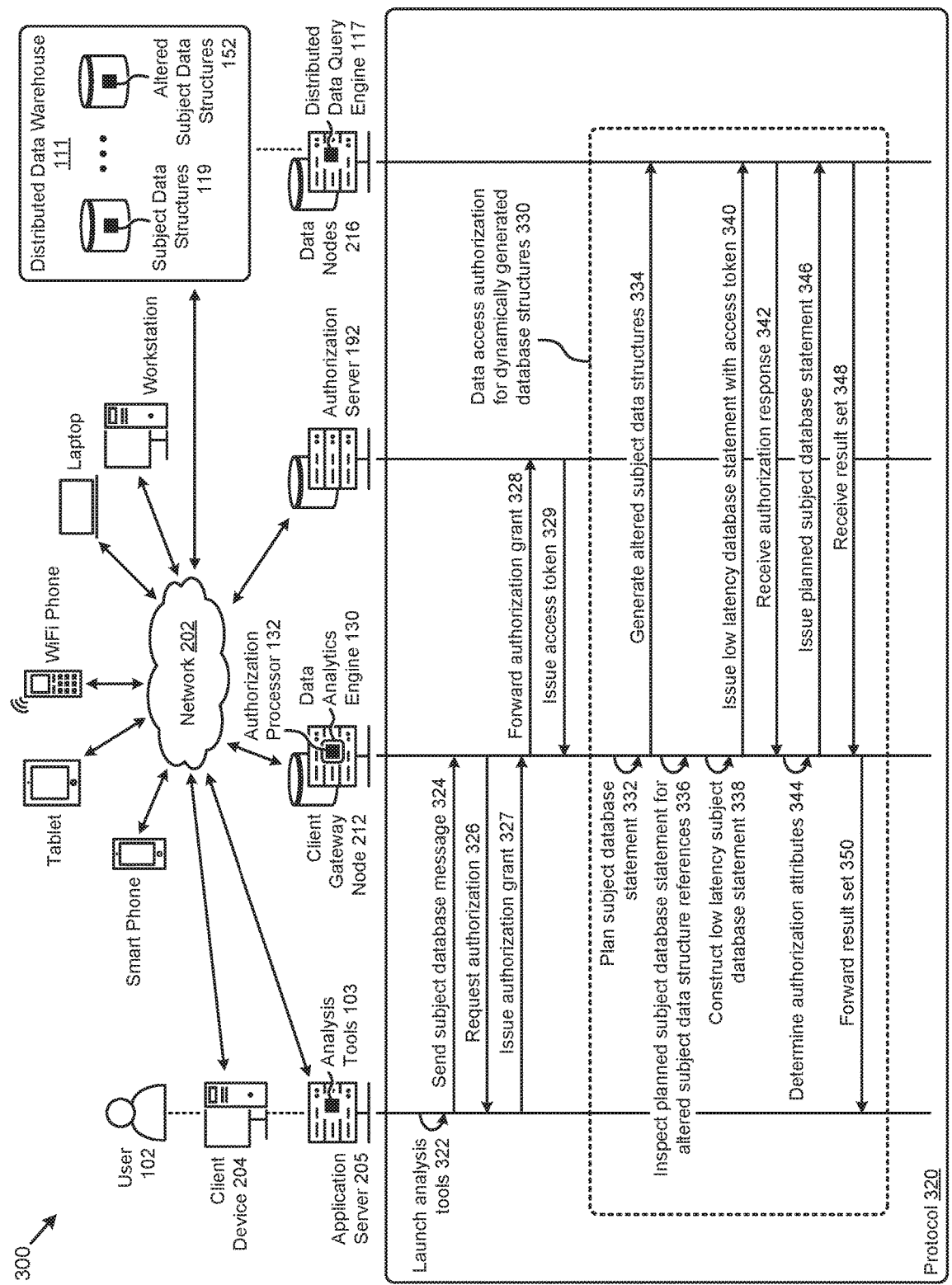
FIG. 3 depicts an environment that supports embodiments of a protocol for data access authorization for dynamically generated database structures, according to an embodiment.

Another embodiment and arrangement of certain components described in FIG. 2 for supporting a protocol for implementing the herein disclosed techniques is described as pertains to FIG. 3.

FIG. 3 depicts an environment 300 that supports embodiments of a protocol for data access authorization for dynamically generated database structures. As an option, one or more variations of environment 300 or any aspect thereof may be implemented in the context of the architecture and functionality of the embodiments described herein. The environment 300 or any aspect thereof may be implemented in any environment.

As shown in FIG. 3, the environment 300 comprises various computing systems (e.g., servers and devices) interconnected by the network 202. The network 202 can comprise any combination of a wide area network (e.g., WAN), local area network (e.g., LAN), cellular network, wireless LAN (e.g., WLAN), or any such means for enabling communication of computing systems. The network 202 can also be referred to as the Internet. More specifically, environment 300 can comprise at least one instance of the earlier described application server 205 coupled to at least one instance of the client device 204 operated by the user 102. As shown, operation of the analysis tools 103 can be facilitated by the application server 205. The environment 300 further comprises other instances of client devices (e.g., a smart phone, a tablet, a WiFi phone, a laptop, a workstation, etc.) that can serve as the client device 204 having software (e.g., analysis tools 103, etc.) and hardware (e.g., a graphics processing unit, display, monitor, etc.) capable of processing and displaying information (e.g., web page, graphical user interface, etc.) on a display. For example, the analysis tools 103 might operate in a browser on the client devices. The client devices can further communicate information (e.g., web page request, user activity, electronic files, computer files, etc.) over the network 202. The environment 300 can further comprise one or more instances of the client gateway node 212 at which a corresponding instance of the data analytics engine 130 comprising the authorization processor 132 can operate. The authorization server 192 and one or more instances of the data nodes can also be included in the environment 300. One or more instances of the earlier described distributed data query engine 117 can operate on the data nodes 216 for accessing the distributed data warehouse 111 comprising the subject data structures 119 and the altered subject data structures 152.

In one or more embodiments, the application server 205, the client gateway node 212, the authorization server 192, and the data nodes 216 can exhibit a set of high-level interactions (e.g., operations, messages, etc.) in a protocol 320. Specifically, as shown, one or more of the analysis tools 103 can be launched at the client device 204 from the application server 205 (see operation 322). The analysis tools 103, for example, can send a subject database message to the data analytics engine 130 at the client gateway node 212 (see message 324). For example, the subject database message might be an HTTP message comprising information associated with certain subject database operations. In a delegated authorization implementation, the data analytics engine 130, serving as the third party application, might request authorization to access certain resources (e.g., subject data structures 119 comprising certain subject data) associated with the subject database statements (see message 326). The application server 205 can respond to the authorization request by issuing an authorization grant to the client gateway node 212 (see message 327). The authorization grant can be forwarded to the authorization server 192

(see message 328) that can respond by issuing an access token to the client gateway node 212 (see message 329).

As highlighted in the protocol 320, a grouping 330 can represent one embodiment of certain messages and/or operations used in systems and protocols for data access authorization for dynamically generated database structures. Specifically, such a grouping of interactions might commence with the data analytics engine 130 at the client gateway node 212 planning a subject database statement based at least in part on the subject database message received from the application server 205 (see operation 332). In some embodiments, the planned subject database statement might reference certain altered subject data structures (e.g., altered subject data structures 152) that can be generated responsive to receiving the subject database message (see message 334). In other cases, the planned subject database statement might reference certain altered subject data structures that existed prior to receiving the subject database message. For example, such altered subject data structures might be generated by an aggregation service provisioned authorized access to certain underlying data for reliably generating the altered subject data structures. In either of the foregoing cases (e.g., dynamic generation or prior generation of the altered subject data structures), while the user might have an authorization to access the subject data structures 119 confirmed by the authorization server 192 (e.g., in the issuance of the access token), an authorization for user 102 to access the altered subject data structures 152 can be nebulous. In these cases, the herein disclosed techniques can be used to verify a data access authorization for the dynamically generated database structures (e.g., altered subject data structures 152).

Specifically, the planned subject database statement can be inspected for references to the altered subject data structures 152 (see operation 336). Such references can indicate an altered subject data structure access associated with a given database statement. If such references exist, a low latency subject database statement can be constructed (see operation 338). For example, the low latency subject database statement can access the same portion of subject data as that of the planned subject database statement, but with the constraint that no altered subject data structures can be used. The low latency subject database statement can further be constructed based at least in part on one or more low latency directives that serve to minimize the response time (e.g., minimize the latency) of the low latency subject database statement. The data analytics engine 130 at the client gateway node 212 can issue the low latency subject database statement with the earlier received access token to the distributed data query engine 117 at the data nodes 216 (see message 340). Responsive to processing the low latency database statement, an authorization response can be received from the distributed data query engine 117 (see message 342). The authorization response can be analyzed (e.g., by the authorization processor 132) to determine certain authorization attributes (see operation 344). For example, if the authorization attributes from the authorization response indicate no authorization violations occurred responsive to processing the low latency database statement, the altered subject data structure access can be considered confirmed. In this case, the planned subject database statement can be issued (see message 346) to return a result set that can be received by the data analytics engine 130 (see message 348) to be forwarded to the analysis tools 103 (see message 350). If authorization violations are detected in the authorization response, an error might be returned to the analysis tools 103 with no issuance of the planned database statement.

Figure 4A:
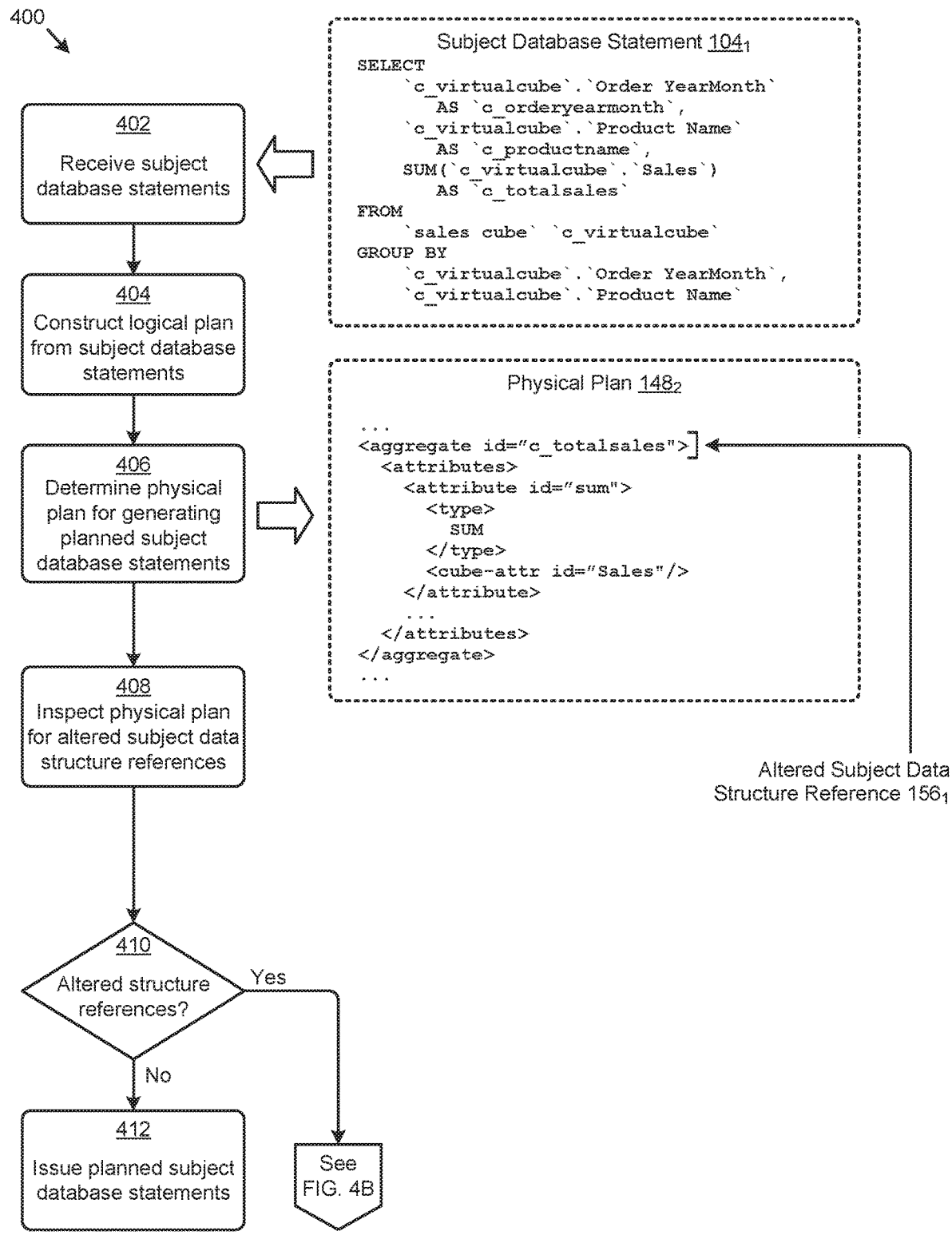
FIG. 4A and FIG. 4B present dynamic data access authorization techniques as implemented in systems for data access authorization for dynamically generated database structures, according to an embodiment.
Figure 4B:
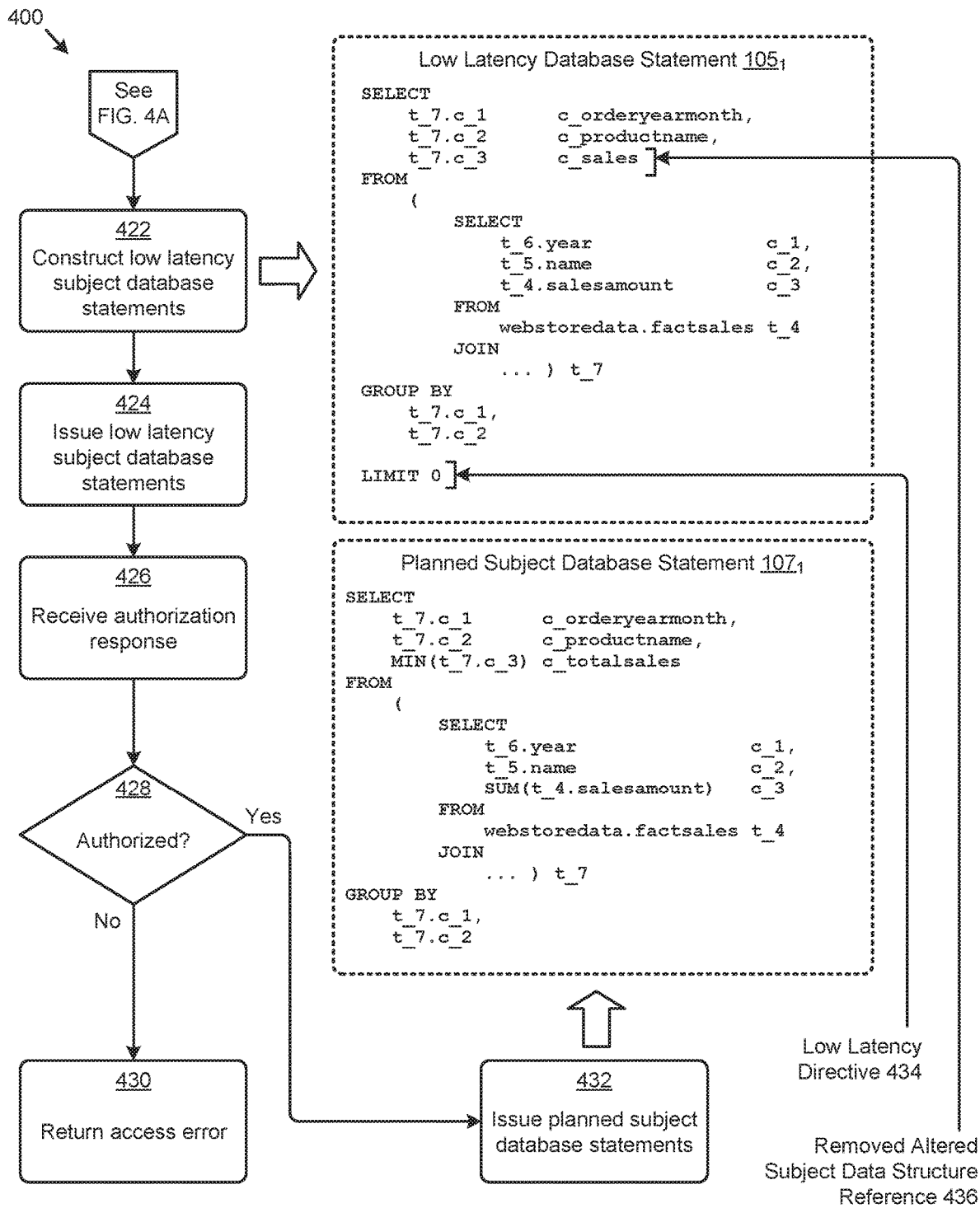

One embodiment illustrating further details pertaining to a dynamic data access authorization technique is presented in FIG. 4A and FIG. 4B.

FIG. 4A and FIG. 4B present a dynamic data access authorization technique 400 as implemented in systems for data access authorization for dynamically generated database structures. As an option, one or more variations of dynamic data access authorization technique 400 or any aspect thereof may be implemented in the context of the architecture and functionality of the embodiments described herein. The dynamic data access authorization technique 400 or any aspect thereof may be implemented in any environment.

FIG. 4A presents one embodiment of a set of steps and/or operations for facilitating a dynamic data access authorization technique according to the herein disclosed techniques for data access authorization for dynamically generated database structures. In one or more embodiments, the steps and underlying operations shown in FIG. 4A can be executed by program instructions stored on a server in a computing environment, such as the client gateway node 212 in the distributed data file system 210 described in FIG. 2. Specifically, the flow in FIG. 4A can commence with receiving one or more subject database statements (see step 402). For example, a subject database statement $104_1$ might be issued by a user (e.g., business intelligence analyst) using a certain analysis tool. As shown in the example, the subject database statement might be querying virtual cube (e.g., c_virtualcube) representation of the subject data for total sales (e.g., 'Sales') by order month (e.g., 'Order Year-Month') and by product name (e.g., 'Product Name'). The subject database statements can then be processed (e.g., parsed, mapped, etc.) to construct a logical plan characterizing various attributes of the subject database statements (see step 404). The logical plan can be used to determine a corresponding physical plan for generating a set of planned subject database statements that can be executed on the subject database (see step 406). As shown, for example, the physical plan $148_2$ might comprise various attributes structured in an XML format that characterize the planned subject database statements. Other techniques (e.g., JSON, non-textual data structure representation in memory, etc.) to codify and/or communicate the physical plan $148_2$ are possible.

In one or more embodiments, the physical plan can be inspected for one or more altered subject data structure references (see step 408). For example, the physical plan might include such references to improve the performance (e.g., query response time) of the planned subject database statements in satisfying the intent of the subject database statements. Specifically, for example, the subject database statement $104_1$ might precipitate the dynamic generation of an aggregate (e.g., 'c_totalsales') that sums the Sales measure of the c_virtualcube, as indicated by an altered subject data structure reference $156_1$ in the physical plan $148_2$. If there are no altered subject data references in the physical plan (see "No" path of decision 410), then the planned subject database statements can be generated from the physical plan to issue for operation on the subject database (see step 412). If certain altered subject data references (e.g., altered subject data structure reference $156_1$) are discovered in the physical plan (see "Yes" path of decision 410), the flow can continue to FIG. 4B.

Referring now to FIG. 4B, the figure presents one embodiment of a set of steps and/or operations for facilitating a dynamic data access authorization technique according to the herein disclosed techniques for data access authorization for dynamically generated database structures. In one or more embodiments, the steps and underlying operations shown in FIG. 4B can be executed by program instructions stored on a server in a computing environment, such as the client gateway node 212 in the distributed data file system 210 described in FIG. 2. Specifically, the flow in FIG. 4B can continue from FIG. 4A (see "Yes" path of decision 410) by constructing one or more low latency subject database statements (see step 422). Such low latency subject database statements can be used to determine an authorization to access any altered subject data and/or altered subject data structures referenced in the physical plan and/or planned subject database statements. Specifically, the low latency subject database statements can be configured to access the same portion of subject data as that of the planned subject database statement, but with the constraint that no altered subject data structures can be used. More specifically, for example, the low latency subject database statement $105_1$ might select from the raw sales data (e.g., c_sales) as compared to the total sales measure (e.g., c_totalsales in the subject database statement $104_1$ in FIG. 4A), to represent a removed altered subject data structure reference 436. The low latency subject database statement $105_1$ can further be constructed based at least in part on one or more low latency directives (e.g., low latency directive 434) that serve to minimize the response time (e.g., minimize the latency) of the low latency subject database statement $105_1$.

The low latency subject database statements can then be issued (see step 424) to receive an authorization response (see step 426). (see message 340). The authorization response can be analyzed to determine certain authorization attributes. In some embodiments, if the authorization attributes from the authorization response indicate no authorization violations (see "Yes" path of decision 428) the planned subject database statements generated from the earlier determined physical plan can be issued (see step 432). For example, as shown, the planned subject database statement $107_1$ might be issued referencing the aggregate c_totalsales. If authorization violations are detected in the authorization response, an access error might be returned with no issuance of the planned database statement (see step 430).

Additional Embodiments of the Disclosure

Additional Practical Application Examples

Figure 5:
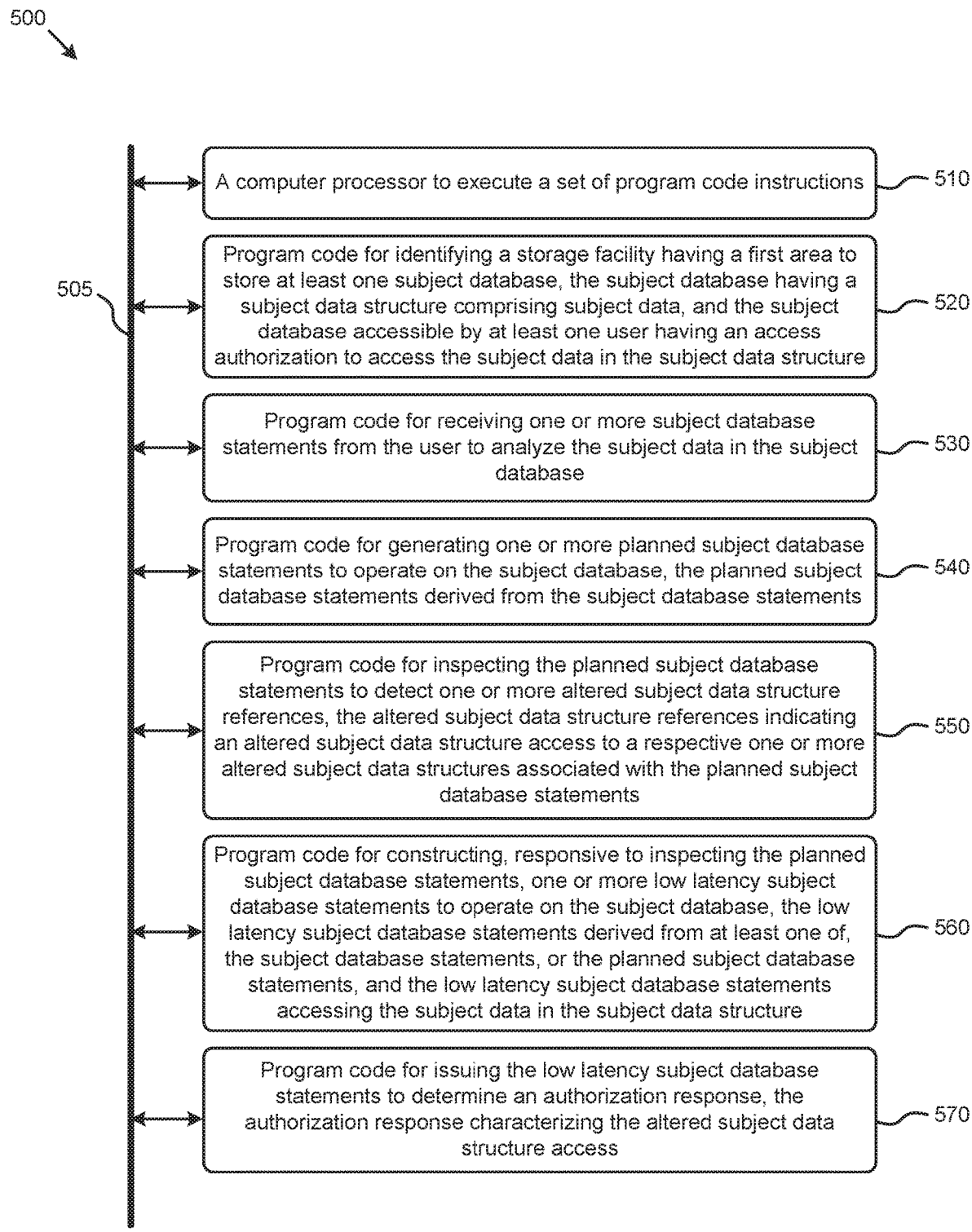
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. The partitioning of system 500 is merely illustrative and other partitions are possible.

Variations of the foregoing may include more or fewer of the shown modules and variations may perform more or fewer (or different) steps, and/or may use data elements in more, or fewer, or different operations. As an option, the system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The shown embodiment implements a portion of a computer system, presented as system 500, comprising a computer processor to execute a set of program code instructions (see module 510) and modules for accessing memory to hold program code instructions to perform: identifying a storage facility having a first area to store at least one subject database, the subject database having a subject data structure comprising subject data, and the subject database accessible by at least one user having an access authorization to access the subject data in the subject data structure (see module 520); receiving one or more subject database statements from the user to analyze the subject data in the subject database (see module 530); generating one or more planned subject database statements to operate on the subject database, the planned subject database statements derived from the subject database statements (see module 540); inspecting the planned subject database statements to detect one or more altered subject data structure references, the altered subject data structure references indicating an altered subject data structure access to a respective one or more altered subject data structures associated with the planned subject database statements (see module 550); constructing, responsive to inspecting the planned subject database statements, one or more low latency subject database statements to operate on the subject database, the low latency subject database statements derived from at least one of, the subject database statements, or the planned subject database statements, and the low latency subject database statements accessing the subject data in the subject data structure (see module 560); and issuing the low latency subject database statements to determine an authorization response, the authorization response characterizing the altered subject data structure access (see module 570).

System Architecture Overview

Additional System Architecture Examples

Figure 6A:
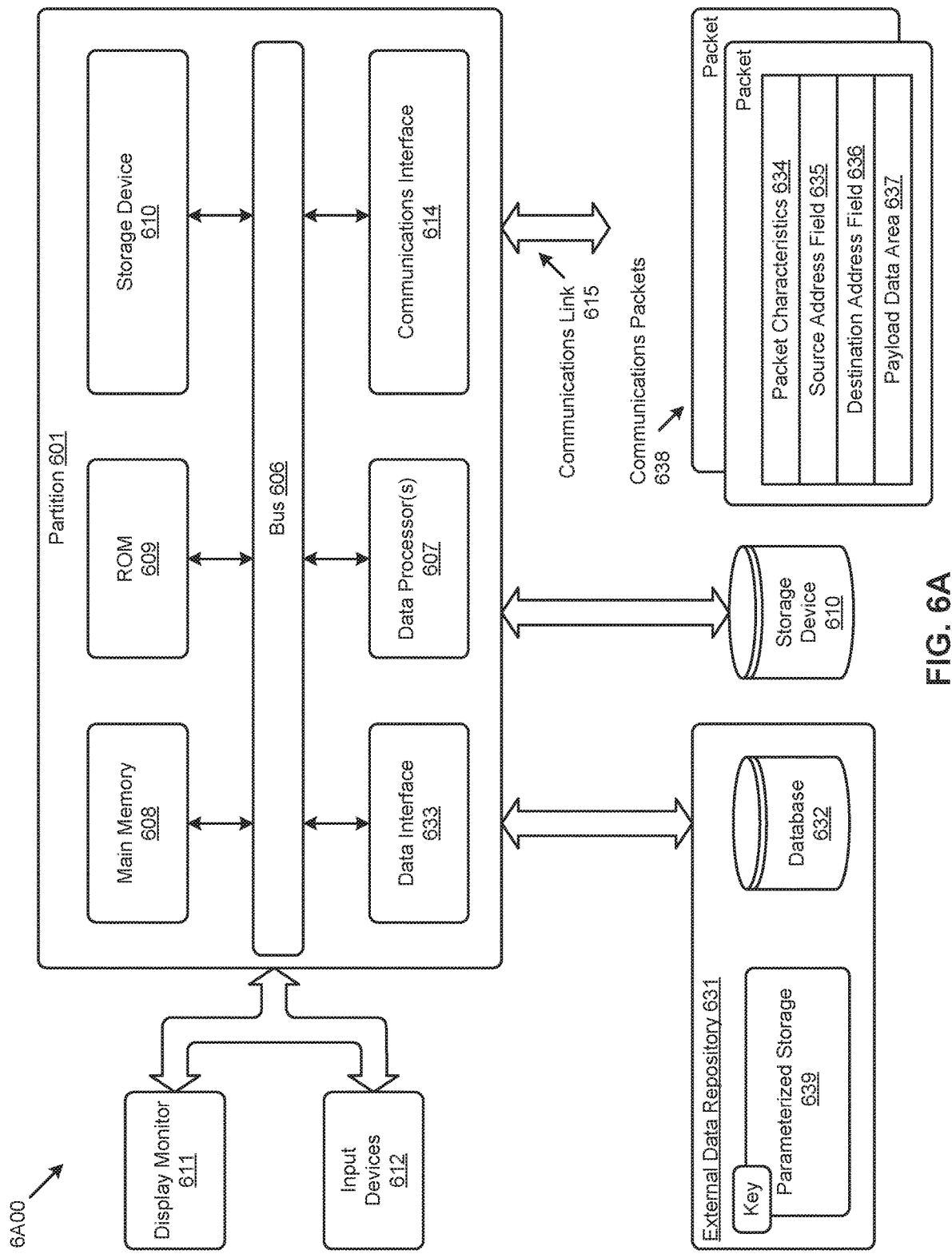
FIG. 6A and FIG. 6B depict exemplary architectures of components suitable for implementing embodiments of the present disclosure and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a CPU, or a multi-core CPU (e.g., data processor 607), a system memory (e.g., main memory 608, or an area of random access memory (RAM)), a non-volatile storage device or non-volatile storage area (e.g., read-only memory or ROM 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. The shown computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

The communications link 615 can be configured to transmit (e.g., send, receive, signal, etc.) any types of communications packets 638 comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 6A00. According to certain embodiments of the disclosure, two or more instances of computer system 6A00 coupled by a communications link 615 (e.g., LAN, PTSN, or wireless network) may perform the sequence of instructions required to practice embodiments of the disclosure using two or more instances of components of computer system 6A00.

The computer system 6A00 may transmit and receive messages such as data and/or instructions organized into a data structure (e.g., communications packets). The data structure can include program instructions (e.g., application code 603), communicated through communications link 615 and communications interface 614. Received program code may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). A module may include one or more state machines and/or combinational logic used to implement or facilitate the operational and/or performance characteristics pertaining to data access authorization for dynamically generated database structures.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of data access authorization for dynamically generated database structures). Such files or records can be brought into and/or stored in volatile or non-volatile memory.

Figure 6B:
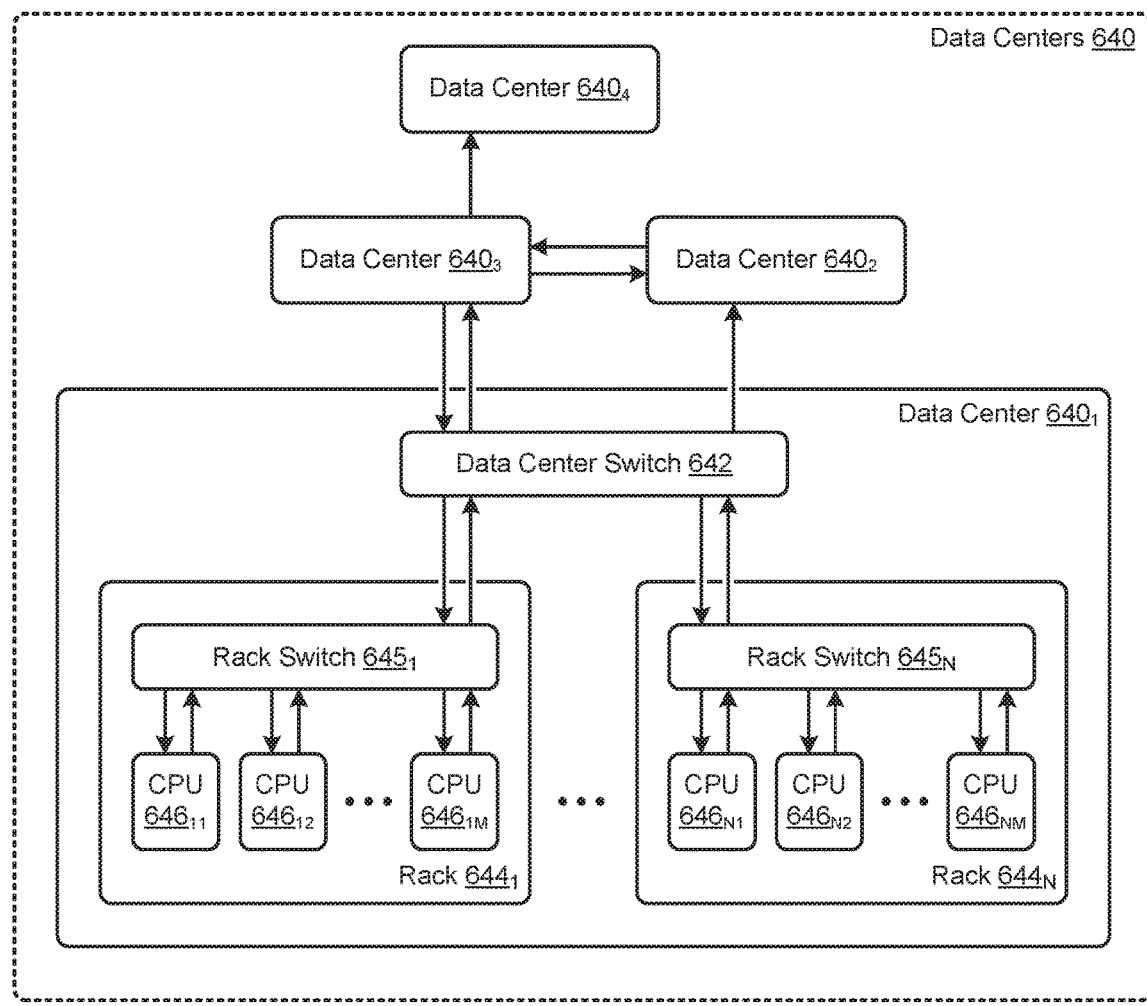

FIG. 6B depicts a block diagram of an instance of a distributed data processing system 6B00 that may be included in a system implementing instances of the herein-disclosed embodiments.

Distributed data processing system 6B00 can include many more or fewer components than those shown. The distributed data processing system 6B00 can be used to store data, perform computational tasks, and/or transmit data between a plurality of data centers 640 (e.g., data center $640_1$, data center $640_2$, data center $640_3$, and data center $640_4$). The distributed data processing system 6B00 can include any number of data centers. Some of the plurality of data centers 640 might be located geographically close to each other, while others might be located far from the other data centers.

The components of distributed data processing system 6B00 can communicate using dedicated optical links and/or other dedicated communication channels, and/or supporting hardware such as modems, bridges, routers, switches, wireless antennas, wireless towers, and/or other hardware components. In some embodiments, the component interconnections of the distributed data processing system 6B00 can include one or more wide area networks (WANs), one or more local area networks (LANs), and/or any combination of the foregoing networks. In certain embodiments, the component interconnections of the distributed data processing system 6B00 can comprise a private network designed and/or operated for use by a particular enterprise, company, customer, and/or other entity. In other embodiments, a public network might comprise a portion or all of the component interconnections of the distributed data processing system 6B00.

In some embodiments, each data center can include multiple racks that each include frames and/or cabinets into which computing devices can be mounted. For example, as shown, data center $640_1$ can include a plurality of racks (e.g., rack $644_1$, . . . , rack $644_N$), each comprising one or more computing devices. More specifically, rack $644_1$ can include a first plurality of CPUs (e.g., CPU $646_{11}$, CPU $646_{12}$, . . . , CPU $646_{1M}$), and rack $644_N$ can include an Nth plurality of CPUs (e.g., CPU $646_{N1}$, CPU $646_{N2}$, . . . , CPU $646_{NM}$). The plurality of CPUs can include data processors, network attached storage devices, and/or other computer controlled devices. In some embodiments, at least one of the plurality of CPUs can operate as a master processor, controlling certain aspects of the tasks performed throughout the distributed data processing system 6B00. For example, such master processor control functions might pertain to scheduling, data distribution, and/or other processing operations associated with the tasks performed throughout the distributed data processing system 6B00. In some embodiments, one or more of the plurality of CPUs may take on one or more roles, such as a master and/or a slave. One or more of the plurality of racks can further include storage (e.g., one or more network attached disks) that can be shared by one or more of the CPUs.

In some embodiments, the CPUs within a respective rack can be interconnected by a rack switch. For example, the CPUs in rack $644_1$ can be interconnected by a rack switch $645_1$. As another example, the CPUs in rack $644_N$ can be interconnected by a rack switch $645_N$. Further, the plurality of racks within data center $640_1$ can be interconnected by a data center switch 642. The distributed data processing system 6B00 can be implemented using other arrangements and/or partitioning of multiple interconnected processors, racks, and/or switches. For example, in some embodiments, the plurality of CPUs can be replaced by a single large-scale multiprocessor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   identifying a first area of a storage facility to store a subject database, the subject database comprising a set of subject data;
   identifying a second area of the storage facility to store a set of subject database metadata, the set of subject database metadata comprising one or more subject database attributes characterizing the subject database;
   identifying at least one user, wherein the at least one user has authorization to access a first portion of the set of subject data, and wherein the at least one user does not have authorization to access a second portion of the set of subject data;
   receiving one or more subject database statements from the at least one user to perform an analysis over the set of subject data;
   selecting at least one virtual multidimensional data model representing the subject database, the at least one virtual multidimensional data model comprising one or more virtual cubes derived from the one or more subject database attributes;
   generating a first set of planned subject database statements to perform the analysis corresponding to the one or more subject database statements, the first set of planned subject database statements based at least in part on the at least one virtual multidimensional data model;
   detecting at least one data structure reference associated with the first set of planned subject database statements, the at least one data structure reference corresponding to at least some of the second portion of the set of subject data; and
   generating, in response to detecting the at least one data structure reference, a second set of planned subject database statements to perform the analysis corresponding to the one or more subject database statements, the second set of planned subject database statements based at least in part on the at least one virtual multidimensional data model, the second set of planned subject database statements generated to determine an authorization response.

2. The method of claim 1, wherein the second set of planned subject database statements is generated based at least in part on one or more constraints.

3. The method of claim 2, wherein at least one of the one or more constraints is based at least in part on the at least one data structure reference.

4. The method of claim 1, wherein the at least one data structure reference is detected at least in part by issuing one or more low latency subject database statements to operate on a set of underlying data corresponding to the at least one data structure reference.

5. The method of claim 4, wherein an access token is issued with the one or more low latency subject database statements to facilitate accessing the set of underlying data.

6. The method of claim 1, wherein the at least one data structure reference corresponds to at least one of, one or more altered subject data structures, one or more aggregates, one or more partitions, one or more shards, one or more indexes, one or more materialized views, or one or more caches.

7. The method of claim 6, further comprising: generating, responsive to receiving the one or more subject database statements, at least one of the one or more altered subject data structures.

8. The method of claim 1, further comprising: generating, responsive to receiving the one or more subject database statements, the at least one virtual multidimensional data model.

9. The method of claim 1, further comprising: issuing the second set of planned subject database statements to return a result set.

10. The method of claim 1, further comprising: determining one or more physical plans representing the second set of planned subject database statements, the physical plans comprising one or more programming code objects.

11. A computer readable medium, embodied in a non-transitory computer readable medium, the non-transitory computer readable medium having stored thereon a sequence of instructions which, when stored in memory and executed by a processor causes the processor to perform a set of acts, the set of acts comprising:
  identifying a first area of a storage facility to store a subject database, the subject database comprising a set of subject data;
  identifying a second area of the storage facility to store a set of subject database metadata, the set of subject database metadata comprising one or more subject database attributes characterizing the subject database;
  identifying at least one user, wherein the at least one user has authorization to access a first portion of the set of subject data, and wherein the at least one user does not have authorization to access a second portion of the set of subject data;
  receiving one or more subject database statements from the at least one user to perform an analysis over the set of subject data;
  selecting at least one virtual multidimensional data model representing the subject database, the at least one virtual multidimensional data model comprising one or more virtual cubes derived from the one or more subject database attributes;
  generating a first set of planned subject database statements to perform the analysis corresponding to the one or more subject database statements, the first set of planned subject database statements based at least in part on the at least one virtual multidimensional data model;
  detecting at least one data structure reference associated with the first set of planned subject database statements, the at least one data structure reference corresponding to at least some of the second portion of the set of subject data; and
  generating, in response to detecting the at least one data structure reference, a second set of planned subject database statements to perform the analysis corresponding to the one or more subject database statements, the second set of planned subject database statements based at least in part on the at least one virtual multidimensional data model, the second set of planned subject database statements generated to determine an authorization response.

12. The computer readable medium of claim 11, wherein the at least one data structure reference is detected at least in part by issuing one or more low latency subject database statements to operate on a set of underlying data corresponding to the at least one data structure reference.

13. The computer readable medium of claim 11, further comprising instructions which, when stored in memory and executed by the processor causes the processor to perform acts of generating, responsive to receiving the one or more subject database statements, one or more altered subject data structures.

14. The computer readable medium of claim 11, further comprising instructions which, when stored in memory and executed by the processor causes the processor to perform acts of generating, responsive to receiving the one or more subject database statements, the at least one virtual multidimensional data model.

15. The computer readable medium of claim 11, wherein the second set of planned subject database statements is generated based at least in part on one or more constraints, and wherein at least one of the one or more constraints is based at least in part on the at least one data structure reference.

16. A system comprising:
  a non-transitory computer readable storage medium having stored thereon a sequence of instructions; and
  a processor that executes the sequence of instructions to cause the processor to perform a set of acts, the set of acts comprising:
  identifying a first area of a storage facility to store a subject database, the subject database comprising a set of subject data;
  identifying a second area of the storage facility to store a set of subject database metadata, the set of subject database metadata comprising one or more subject database attributes characterizing the subject database;
  identifying at least one user, wherein the at least one user has authorization to access a first portion of the set of subject data, and wherein the at least one user does not have authorization to access a second portion of the set of subject data;
  receiving one or more subject database statements from the at least one user to perform an analysis over the set of subject data;
  selecting at least one virtual multidimensional data model representing the subject database, the at least one virtual multidimensional data model comprising one or more virtual cubes derived from the one or more subject database attributes;
  generating a first set of planned subject database statements to perform the analysis corresponding to the one or more subject database statements, the first set of planned subject database statements based at least in part on the at least one virtual multidimensional data model;
  detecting at least one data structure reference associated with the first set of planned subject database statements, the at least one data structure reference corresponding to at least some of the second portion of the set of subject data; and generating, in response to detecting the at least one data structure reference, a second set of planned subject database statements to perform the analysis corresponding to the one or more subject database statements, the second set of planned subject database statements based at least in part on the at least one virtual multidimensional data model, the second set of planned subject database statements generated to determine an authorization response.

17. The system of claim 16, further comprising instructions which, when executed by the processor causes the processor to perform acts of generating, responsive to receiving the one or more subject database statements, one or more altered subject data structures.

18. The system of claim 16, further comprising instructions which, when executed by the processor causes the processor to perform acts of generating, responsive to receiving the one or more subject database statements, the at least one virtual multidimensional data model.

19. The system of claim 16, further comprising instructions which, when executed by the processor causes the processor to perform acts of issuing the second set of planned subject database statements to return a result set.

20. The system of claim 16, further comprising instructions which, when executed by the processor causes the processor to perform acts of determining one or more physical plans representing the second set of planned subject database statements, the physical plans comprising one or more programming code objects.

\* \* \* \* \*